US007831336B2

(12) United States Patent
Gumpert

(10) Patent No.: US 7,831,336 B2
(45) Date of Patent: Nov. 9, 2010

(54) EXPANDABLE PERSONAL PORTABLE MEDICATION DISPENSER FOR HOMEBOUND AND INSTITUTIONAL USE

(76) Inventor: Ronald S. Gumpert, 99 Edgewood Ave., Smithtown, NY (US) 11787

( * ) Notice: Subject to any disclaimer, the term of this patent is extended or adjusted under 35 U.S.C. 154(b) by 0 days.

(21) Appl. No.: 10/904,344

(22) Filed: Nov. 4, 2004

(65) Prior Publication Data

US 2006/0097000 A1 May 11, 2006

(51) Int. Cl.
*G06F 17/00* (2006.01)

(52) U.S. Cl. ....................... 700/244; 700/242; 700/243; 221/2; 221/7; 221/8; 221/10; 221/12; 221/13; 221/15

(58) Field of Classification Search ..................... 221/2, 221/3, 4, 5, 7, 8, 9, 10, 12, 13, 15, 21; 700/236, 700/244, 243, 242
See application file for complete search history.

(56) References Cited

U.S. PATENT DOCUMENTS 4,811,764 A * 3/1989 McLaughlin .................. 221/2
5,441,165 A * 8/1995 Kemp et al. .................... 221/2
5,609,268 A * 3/1997 Shaw ............................ 221/2
5,752,621 A * 5/1998 Passamante .................. 221/13
6,138,865 A * 10/2000 Gilmore ........................ 221/2
6,304,797 B1 * 10/2001 Shusterman ................ 700/243
6,311,868 B1 * 11/2001 Krietemeier et al. ........... 222/1
6,594,549 B2 * 7/2003 Siegel ........................ 700/241

* cited by examiner

*Primary Examiner*—Gene Crawford
*Assistant Examiner*—Timothy R Waggoner
(74) *Attorney, Agent, or Firm*—Maier & Maier, PLLC

(57) ABSTRACT

This invention is a fault tolerant computer controlled automatic medication dispenser with a unique dispensing system. This dispensing system enables a large number of detachable medication filled dispensing wheels to be vertically stacked and held in a fixed position; and then be automatically dispensed one dispensing wheel. The patient's medication can be dispensed for a few days, weeks, and or many months without a refill. These medication filled dispensing wheels are stored and held in a fixed position within the dispenser.

11 Claims, 10 Drawing Sheets

EXPANDABLE PERSONAL PORTABLE MEDICATION DISPENSER FOR HOMEBOUND AND INSTITUTIONAL USE

BACKGROUND OF INVENTION

This invention relates generally to the art of medication dispensers and more particularly to expandable portable medication dispensers.

BACKGROUND AND DESCRIPTION OF PRIOR ART

Originally automatic medication dispensers were made to dispense medication only to home bound patients. The medication dispensing problem has only been partially solved by the introduction of a number of manual, semi-automatic, and portable automatic medication dispensers. Within this context, the term portable means a homebound dispenser that can be moved from one home based location to another home based location. There is no vertically stacked single unit and dual purpose personal-portable and homebound-institutional medication dispenser that is capable of dispensing a multiple number of vertically stacked dispensing wheels to the most comprehensive, diversified, and specialized groups of medical and psychiatrically diagnosed patient.

A homebound-institutional dispenser can be placed at the bedside of patients who are either homebound, hospitalized, in assisted living facilities, nursing homes, group homes for exceptional and special needs, alcohol and substance abuse treatment facilities-group homes, and all other related health related facilities. With a personal-portable dispenser the patient will be able to inconspicuously and conveniently carry their dispenser while they are working, participating in their community, traveling, vacationing, and or visiting friends and family. The dispenser needs to be about the size of a small compact disc player and or smaller. Yet, it must be able to be expanded to any size prescribed by the physician and or desired by the patient.

The dispenser must can be also be used as either a homebound-institutional unit or a personal and portable dispenser by patients with special and or exceptional dispensing needs such as: dispensing medication safely and securely to alcohol and substance abuse patients, the psychotically confused and disorganized psychiatric patient, the blind/visually impaired and or the deaf/hearing impaired patient, patients with time sensitive critical medication dispensing needs, and also for people who are forgetful and can't remember to take their scheduled medication.

Prior art has failed to solve the problem because it was too narrowly focused on the dispensing needs of the home bound patient and on the dispensing needs of the usual and limited categories of medical, and psychiatric patients. Therefore, they produced primarily large homebound dispensers. Prior art people failed to solve the problem of how to dispense medication to patients that must take their medications throughout their days and evenings. Prior art people failed to develop an automatic dispenser that was small enough to be carried inconspicuously and conveniently by patients while they are working, performing their community activities, vacationing, traveling, and visiting friends and family members.

It didn't recognize the unfulfilled and growing need for a personal-portable automatic medication dispenser. Prior art people failed to solve the problem of safely and securely dispense medication to patients suffering from the disease and underlying biochemical, neurological, and genetic etiological basis and symptoms of alcoholism and substance abuse. These untreated and underlying symptoms initiated the disease and presently sustains it.

Subsequently, prior art failed to develop a series of mechanical systems and treatment procedures that will rehabilitate and "cure" alcoholism and substance.

Prior art failed to envision a mechanical means whereby a homebound-institutional and personal-portable dispenser can be integrated into a single dual purpose automatic medication dispenser. They failed to envision and discover a means whereby a series of individual medication dispensing wheels can be vertically stacked one on top of the other; and then be automatically dispensed one medication dispensing wheel at a time. They failed to discover a means whereby vertically stacked dispensing wheels can be automatically held in fixed position, and then automatically interconnected and interlocked with one another; and then be dispensed one dispensing wheel at a time and one dispensing unit at a time.

Prior art also failed to solve the problem of how to automatically dispense medication to patients who are blind and or visually impaired, deaf and or hard of hearing, cognitively challenged, psychotically disorganized and confused. And for a patient that doesn't want others to know that they are taking prescribed medications on regular basis. Also, prior art people failed to solve the problem of how to provide the dispensing services of two separate medication dispensers for the price of one a competitors self limiting dispenser. In addition, prior art people failed to solve the problems listed in the items (a-o) in the "Advantages Of The Invention Over Prior Art." All the these listed advantages, innovations, medical treatment, and medication delivery breakthroughs will provide enormous cost saving and increased productivity on both a domestic and global basis.

Why is a solution needed? A solution is needed for the successful treatment of alcoholism and substance for the following reasons: to stop a deadly and destructive worldwide epidemic of substance abuse; to stop and prevent motor vehicle accidents caused by people who are alcohol impairment and intoxication. To stop the chronic substance abuse driver from being able to start their motor vehicle when alcohol impaired and or intoxicated. And for patients who have already started their car and then start drinking while they driving. The current invention will prevent the following behaviors and the subsequent damages: elimination of drunk driving; a sharp reduction in crime rates; death and personal damages; destruction of families; and the costs involved in the detection, prosecution, incarceration, and supervision of patients convicted of crimes related to their alcohol and substance abuse. It will stop the pain, suffering, and sense of hopelessness that these patients feel. This in turn will reduce the suicide rate of substance abusers. In England, alcoholism and substance abuse is the number one cause for suicides.

Presently there is no fool proof means to stop the alcohol impaired and or intoxicate patient from driving. A series of new inventions and a patent pending inventions will provide a fool proof means to stop the alcohol impaired and or intoxicated patient from starting and driving their motor vehicle; and at the same time, automatically teach the patient how to regain their sobriety.

A solution is needed to prevent "medication mistakes" in hospital and all other health related facilities and also within a patient's home. A solution is needed in order to safely release prison inmates who are the victims of substance abuse and alcoholism. A solution is needed in order to significantly reduce the cost of health care services and to increase the productivity of hospitals and all other health related facilities. This invention and a series of additional new inventions will provide a solution for the problems outlined above. Additional advantages are listed in the alphabetically listed (a-o) of "Advantages Of The Invention Over Prior Art."

The third question is why people didn't think of a solution before ? The United States government and corporations have been aware of the problems identified above and of a rapidly growing worldwide healthcare crisis. The government and major corporations have already made a number of very significant changes related to retirement, age to collect social security, and numerous other healthcare related benefits Prior art are just beginning to recognize this crisis and phenomena. Therefore, they haven't developed practical and creative ways to meet this coming crisis and present epidemic. The unresolved social, economic, law enforcement, medication, healthcare and health delivery problems of the past twentieth century have now reached a crisis stage. It is threatening the lives and financial security of America and of many other countries in this twenty first century.

For the first time in history a unprecedented demographic phenomena and event will unfold in American and in other countries around the world. For the first time in history the vast majority of the world's population will become senior citizens. For the first time in history this aging work force will be unable to retire until they reach the age of sixty five plus. For the first time in recent history corporations have: cut full time jobs and replace them with part time positions; severely cut and or eliminated healthcare, medication, and retirement benefits. This means the employee will have to work longer and harder for less compensation and benefits. It also means that many middle class people will fall into the lower and lower middle class and income bracket. All of the above changes will create significant stress for this aging and vulnerable work force. Subsequently, they will experience a significant need for increased healthcare services and medications. They will also have to cope with an unprecedented and overwhelming increase in physical, economic, and emotional stress. Their vulnerability and increased Susceptibility to illness and age related diseases and will be exasperated. Prior art people didn't for recognize these pressing economic needs and the need to resolve the unresolved medication dispensing and treatment problems of the past twentieth century.

Why is a solution needed now? A solution is needed now because all of the events listed above are rapidly unfolding now. A solution is needed now in order to successfully manage the challenges of this world wide healthcare and economic crisis. It threatens to overwhelm the resources of governments, corporations, and healthcare systems on a global basis. Prior art people were not thinking about new and innovative ways to manage this emerging and rapidly expanding healthcare crisis. And to accomplish this within the economic restraints of a new and emerging global economy. They weren't thinking about a new medication dispensing system that will automatically dispense a patient's medication while they are working, functioning in their community, traveling, vacationing, visiting friends and family; and or while in a hospital, an assisted living facility, nursing homes, and in all other health related facilities. They weren't thinking about an integrated, interconnected and seamless networking system that automates, integrates and manages the medication and treatment processes between private physician, hospitals physicians, local community pharmacists, hospital pharmacists and all of the health related facilities and the patient.

In order to economically and safely mange all of these mandatory, and complicated processes, interactions, transactions, and services a new and innovative means to automate and integrate these interactive processes needs to be developed. The caregiver automatic personal-portable and home bound medication dispenser, its interrelated systems, and a series of new inventions will provide the framework and foundation for a totally automated and integrated treatment and medication dispensing system. Prior art people failed to imagine a means to automatically interconnect and interlock a series of vertically stacked medication dispensing wheels. The ability to stack, hold in place, and then to automatically interconnect and interlock a series of vertically stacked dispensing wheels enables a dispenser to be reduced and or expanded to any desired size. An infinite number of medication filled dispensing wheels can be stored and dispensed in a timely manner from this vertically stacked dispenser.

The prior art also failed to recognize and to invent a means to alert patient's who are visually impaired, hearing impaired, psychotically confused and disorganized, and cognitively impaired to attend to and comply with their medication schedule. The dispenser will enable patients to manage, and more effectively control their medical and or psychiatric disorders. Subsequently, patients will be able to maintain their employability for extended periods of time. Prior art didn't provide a means whereby numerous companies will be able to provide medication dispensing services to a wide variety of patients. The dispenser is capable of automatically notifying the pharmacist, distributor, home maintenance organization, and pharmaceutical companies about the status of the patient's dispenser. These companies will be able to automatically, and on timely basis refill the medication dispensing wheels, and then ship them to any and all parties involved in this dispensing process.

The dispenser will help to relieve family members and patients from the stressful tasks associated with dispensing and consuming numerous medications. This will allow the patient and the family to refocus their attention on more positive and enjoyable thoughts and activities. In addition, the patient will be relived of the guilty they often experience when feeling helpless and dependent on their family. Prior art people failed to realize the important and central role of the pharmacist in the medication dispensing process. This invention and several related inventions will support, reinforce, and enhance the dispensing services of the pharmacist.

For the foregoing reasons, there is a need for a medical dispenser that is manual, semi-automatic and portable for home and institutional use. There is still room for improvement in the art.

SUMMARY OF INVENTION

This present invention is a fault tolerant computer controlled automatic medication dispenser with a unique dispensing system. This dispensing system enables an infinite number of detachable medication filled dispensing wheels to be vertically stacked and held in a fixed position; and then be automatically dispensed one dispensing wheel at a time and one dispensing unit at a time for only unlimited periods of time. The patient's medication can be dispensed for a few days, weeks, and or many months without a refill. These medication filled dispensing wheels are stored and held in a fixed position within the dispenser. Then they will be automatically dispensed on a timely basis one dispensing wheel at a time and one dispensing unit at a time. The capacity to vertically stack an almost infinite number of dispensing wheels enables the dispensing wheels and the dispenser to be reduced to any desired size. Two vertically stacked and small size dispensing wheels can dispense the same number of medication doses as one of the competitor's standard and larger size dispensers. This unique capability enables the dispenser to be reduced to the size of a personal portable dispenser. The dispenser can be reduced to the size a small compact disc player; and or smaller. The stacked dispensing wheels and the dispenser can also be expanded to any size desired by the patient and or prescribed by the physician. This will enable medication to be dispensed for many months without refilling.

The dispenser can be custom designed and manufactured as a single automatic personal-portable and or homebound-institutional medication dispenser. The parts for the dispenser can be custom designed and manufactured to meet any and all possible dimensions and specification. The dimensions for each single dispensing unit can be expanded to any desired size. Then an infinite number of medication dispensing wheels can be vertically stacked in the dispenser. For example, the dispensing wheels and the dispenser can be custom designed to safely dispense numerous bottles and tubes of medication, syringes, prescription filled syringes, dressings, replacement parts for equipment being used at the patient's bedside, and for numerous other healthcare items. All of the above items can dispensed in a single dispensing unit, and or in multiple units. And then dispensed at varied times throughout the day and evening.

The caregiver automatic dispenser can be placed at the bedside of patients in hospitals, assisted living facilities, nursing homes, and all other types of health related facilities. It can also be used as the main part of an automated medication dispensing system for hospitals and all other health related facilities. By using a computerized monitoring and patient compliance system, a single nurse would be able to monitor and assist all patients.

This invention will automatically dispense medications on a timely and programmed basis; and at the same time monitor the patient's medication compliance regime. The invention will coordinate the multi-tasking requirements, of the signaling/directing and the compliance/verification program of the patient's medication dispenser. Such as: the tracking and recording of a multiplicity of medications due to be consumed according to a schedule at a multiplicity of daily times, a comprehensive and persistent alerting system including a human voice, and a transmitter that will activate a new invention. The invention will alert a patient who is at remote distance from their dispenser. It will also alert a healthcare provider and or family member of a mechanical breakdown and or a patient emergency. The dispenser will have a means for keeping a record of all medication deliveries.

Objects and Advantages

Accordingly, several objects and advantages of the present invention are:

(a) to provide a dispenser that can simultaneously and comprehensively service both the personal-portable and homebound-institutional dispensing needs of patients while at work, actively participating in all community activities. The same dispenser can be used as a bedside dispenser in hospitals, assisted living facilities, nursing homes, and or for the home bound patient.

(b) to provide a custom designed single dual purpose modular automatic dispenser that can safely and securely store and dispense numerous bottles of medication, prescription filled and or unfilled syringes, dressings, replacement parts for equipment being used at the patient's bedside, and or for other health related items.

(c) to provide a custom designed dispenser with dispensing wheels units that can be expanded to any desired size. The individual units can be expanded in length, height, width, and depth without sacrificing the capacity to dispense an infinite number of dispensing wheels and their related dispensing units.

(b) to provide comprehensive personal-portable automatic dispenser that will dispense a patients medications while they are at work, traveling, vacationing, actively participating in community activities, and visiting friends and family.

(e) to provide personalized and automated dispensing services to the homebound and or working patient with special and exceptional dispensing needs; such as patients that are blind and visually impaired, the deaf and hard or hearing, the cognitively challenged, and the psychotically disorganized and confused psychiatric patient.

(f) to provide personalized and automated dispensing services to the homebound and or working and community active patient with time sensitive dispensing needs; such as epilepsy and seizure disorders, diabetes, cardiac arrhythmic disorders, asthma, panic anxiety attacks, and essential hypertension.

(g) to provide a personalized and automated bedside-table top dispenser that will be online with the nurse's medication compliance computer; the nurse will be able to monitor, supervise, witness, assist, and record the patient's medication compliance automatically.

(h) to provide a bedside-table top dispenser that will be the main part of a totally integrated, interconnected, and automated medication dispensing system that coordinates and manages the interactions and communications between all parties [8]involved in dispensing medication to patient's in all healthcare facilities, pharmacies, and in private of local physicians.

(i) to provide a safe and secured means to medicate alcohol and substance abuse patients for the underlying symptoms that initiated and presently sustains their addiction; the patient's medications will be secured within a metallic dispenser that can be locked, and filled by a pharmacist.

(j) to provide the worldwide criminal justice system and correctional facilities with a means whereby they will be able to safely pardon at least a million plus alcohol and substance abuse inmates; the dispenser is metallic and it can be locked by the pharmacist who dispenses the patient's medications.

(k) to provide a dispenser that can dispense its medications for several months without requiring a refill.

REFERENCE COMPONENTS IN DRAWINGS

FIG. 1 is one of the preferred embodiments of the Caregiver Expandable Personal Portable and Homebound—Institutional Medication Dispense.

It is an individual V shaped medication container,
dispenser's housing,
two halves of the cylindrical housing of the dispenser,
base of the dispenser with a skid proof rubber pad,
dispenser's front operating and dispenser panel,
liquid crystal display LCD,
red circular panic button,
rectangular LED light,
center first dispensing wheel floor,
shallow semicircular dispensing cup at the base,
internal medication drawer, steeper motor, interconnected first or drive dispensing wheel #1, with one of the first preprogrammed dispensing units, flat metallic interconnecting probe on top of dispensing wheel, groove that encircles the base of second dispensing wheel, width of the base and outside wall of a dispensing wheel, entrapment room, base of dispensing wheel number two, thin flexible metallic probe, magnetic plate or entrapment wall, proximal wall first dispensing unit dispensing wheel number two, external door to the internal medication drawer, locking device, inclined and partially enclosed slide, top of the back wall of the medication containment room, top roof medication containment room, parts attachment floor and its bottom, flat metallic dispensing bar, thin flexible metallic probe, miniature or small solenoid, U shaped top of the bottom half of the dispenser's housing, two thin metallic rods, from inside wall and center of the top half dispenser housing, two small circular and corresponding receiving holes, optional miniature or small sized video camera, RS-232 interface, an internal electronic, an external wall of electronics compartment, a real time clock with watch dog timer, batteries to power the speaker, speaker, voice chip, a receiver, a transmitter or wireless radio frequency generator, back up batteries to power emergency response system, modem, male rectangular gear shaft, female receiving hole, bottom half solid circular center of the first or drive dispensing wheel, ball bearing ring or wheel, cut out or molded tire shaped receiving wheel or ring, a partially house or enclosed ball bearing, male geared shaft with two or four vertical protruding and interlocking square male ridges, two or more receptors for recharging the batteries, Watch Dog Timer, connector to plug in a co-axial cable, nuts, bolts, washers, rivets to secure first dispensing wheel floor and parts attachment floor, vertical cut out groove on the outside wall of each vertically stacked dispensing wheel, a sixteen unit V shaped dispensing wheel, a fourteen unit V shaped dispensing wheel, top ceiling of the modular dispensing wheel, bottom floor of the modular dispensing wheel system, a slide to the semicircular dispensing cup at the base dispenser, start button to turn on the dispenser, start button to run the computer programs, and a buzzer to alert the patient Reference Components—Second Embodiment upper half of the dispenses housing, medication dispensing wheel, modular dispensing wheel, two vertical rods top inside and center of the top for the dispenser's cover, single squared rod, two circular receiving holes, a single squared receiving hole, groove that encircles either the top or bottom dispensing wheel, a spring loaded pop up interconnecting probe, a spring loaded snap down interconnecting probe, partially enclosed ball bearing, interconnecting entrapment hole, a spring, floor at the base of the entrapment hole, ball bearing or wheel bearing outside wall, and a ball bearing or wheel bearing inside wall center.

BRIEF DESCRIPTION OF DRAWINGS

Without restricting the full scope of this invention, the preferred form of this invention is illustrated in the following drawings.

DETAILED DESCRIPTION

The dispenser 1 is a vertically stacked single unit and dual purpose personal-portable and or homebound-institutional medication dispenser. It is capable of safely dispensing an almost infinite number of medication filled dispensing wheels to the most comprehensive, diversified, and specialized groups of medical and psychiatrically diagnosed patients. This dispenser is the most technologically advanced and sophisticated automatic medication dispenser of this twenty first century. No other single medication dispenser can service both the personal-portable and home-institutional medication dispensing needs of patients. The dispenser will provide novel, innovative, and breakthrough dispensing and treatment services for the numerous unresolved medical and psychiatric dispensing problems of the past twentieth century.

Other objects, advantages, and novel features of the invention will become apparent from the following detailed description of the invention when considered in conjunction with the accompanying drawings.

Figure 1A:
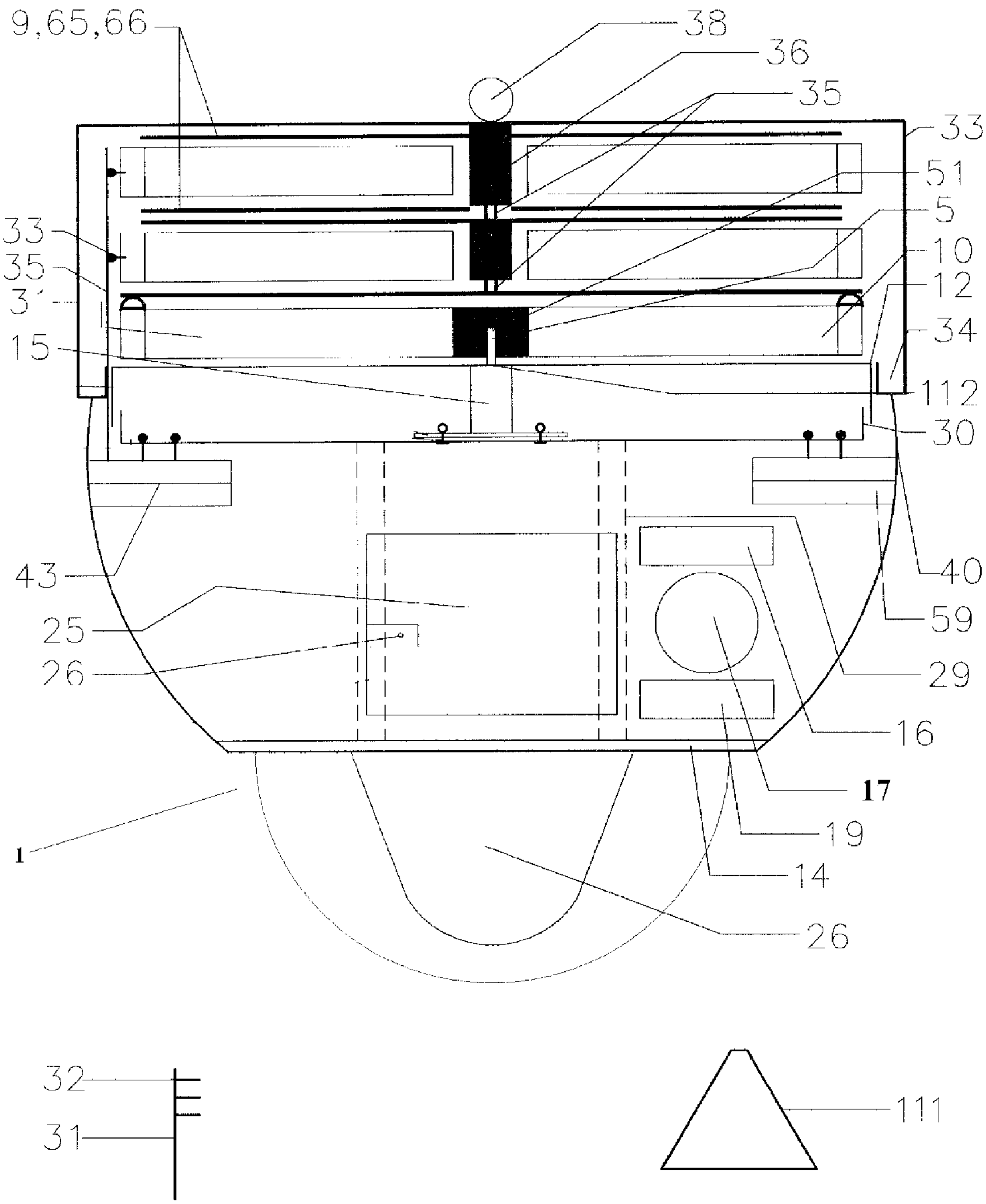
FIG. 1*a* is an external view of the dispenser and its dispensing door.
Figure 1B:
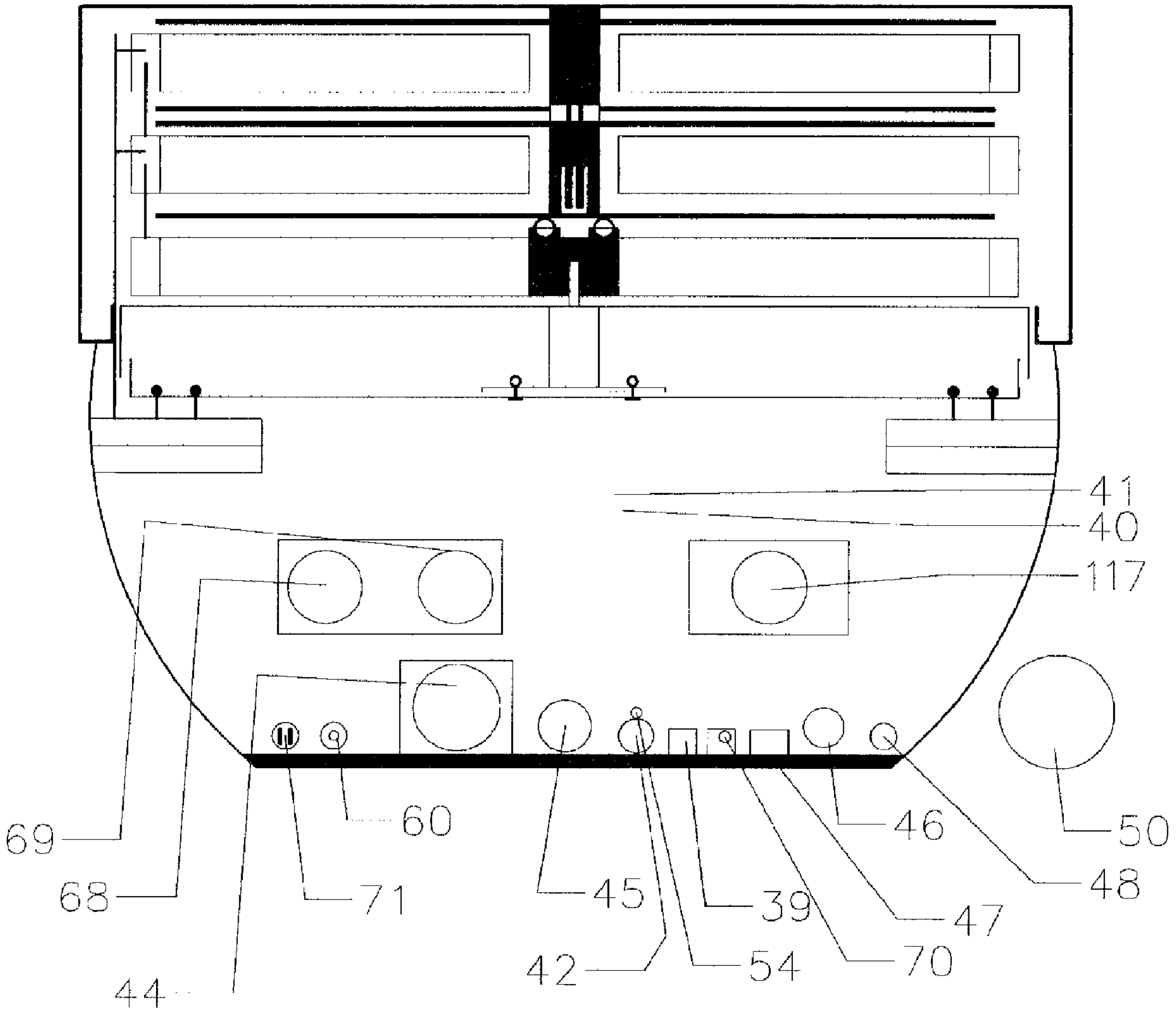
FIG. 1*b* is an external view of the dispenser and its shallow external semicircular medication cup.
Figure 1C:
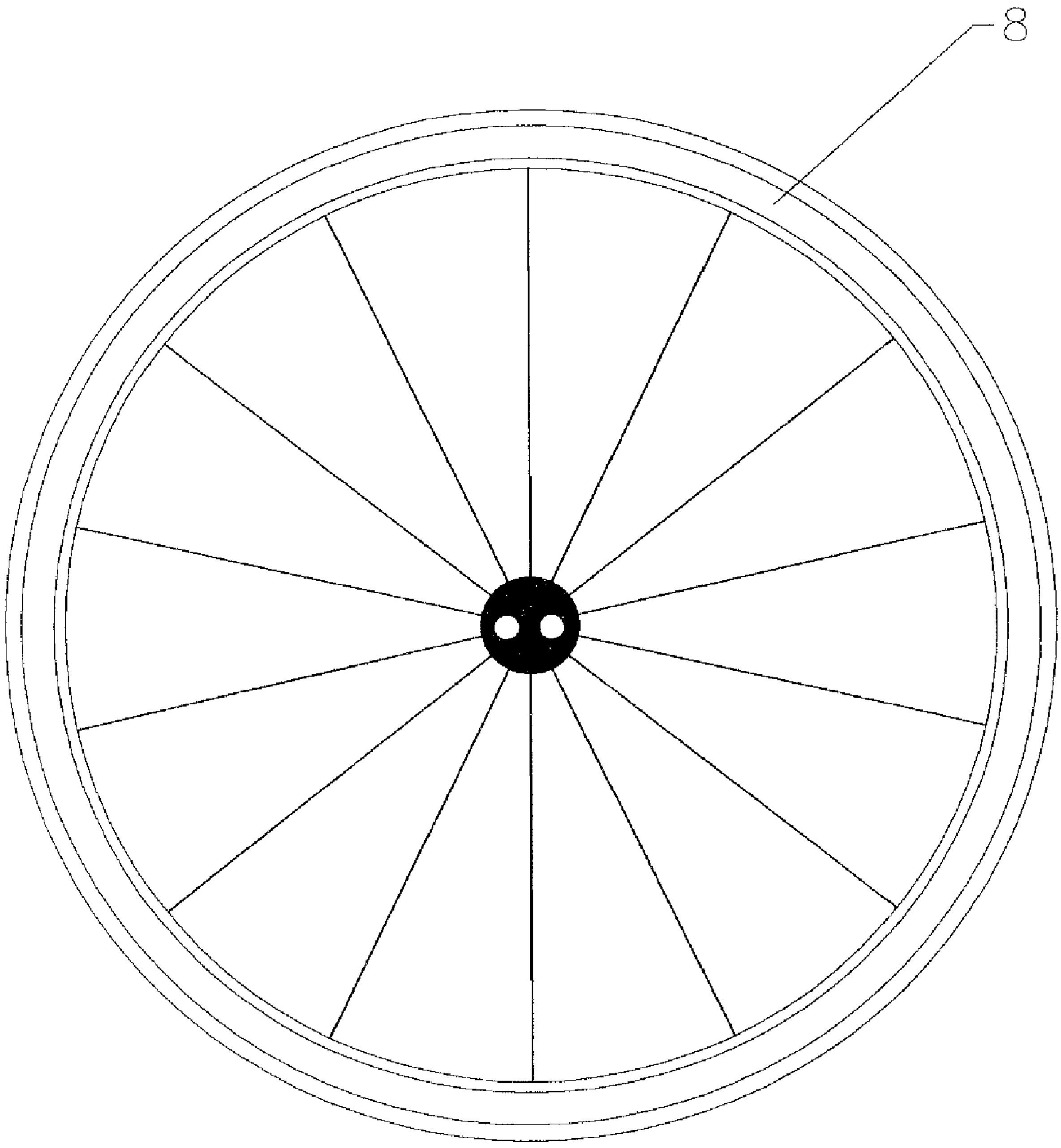
FIG. 1*c* is a top view of a dispensing wheel.

In the drawings, of the caregiver automatic medication dispenser, closely related figures have the same number but different alphabetic suffixes. Like characters represent like or corresponding parts throughout the several views, one sees in FIGS. 1*a*, 1*b* and 1*c* are a view of the preferred embodiment of an expandable caregiver personal-portable and homebound-institutional automatic medication dispenser or device 1. The dispenser delivers individual V shaped medication containers 111 containing all of the medication needed at the time delivered. The dimensions of its housing 12 are (approximately 12 cm in diameter×6 cm in height). This panel is a structural cross member (0.100 thick aluminum plate with a plastic facade) screwed and or riveted onto the outer wall of the dispenser. It is attached to the lower half and outside wall of the dispenser's housing and next to the dispensing draw. The device 1 has a liquid crystal display (LCD) 16 (approximately 2 cm. long×0.5 cm wide×0.2 cm thick) and located in the upper most part of the display panel. It will electronically display the day of the week, time of the day, and the date.

Figure 2:
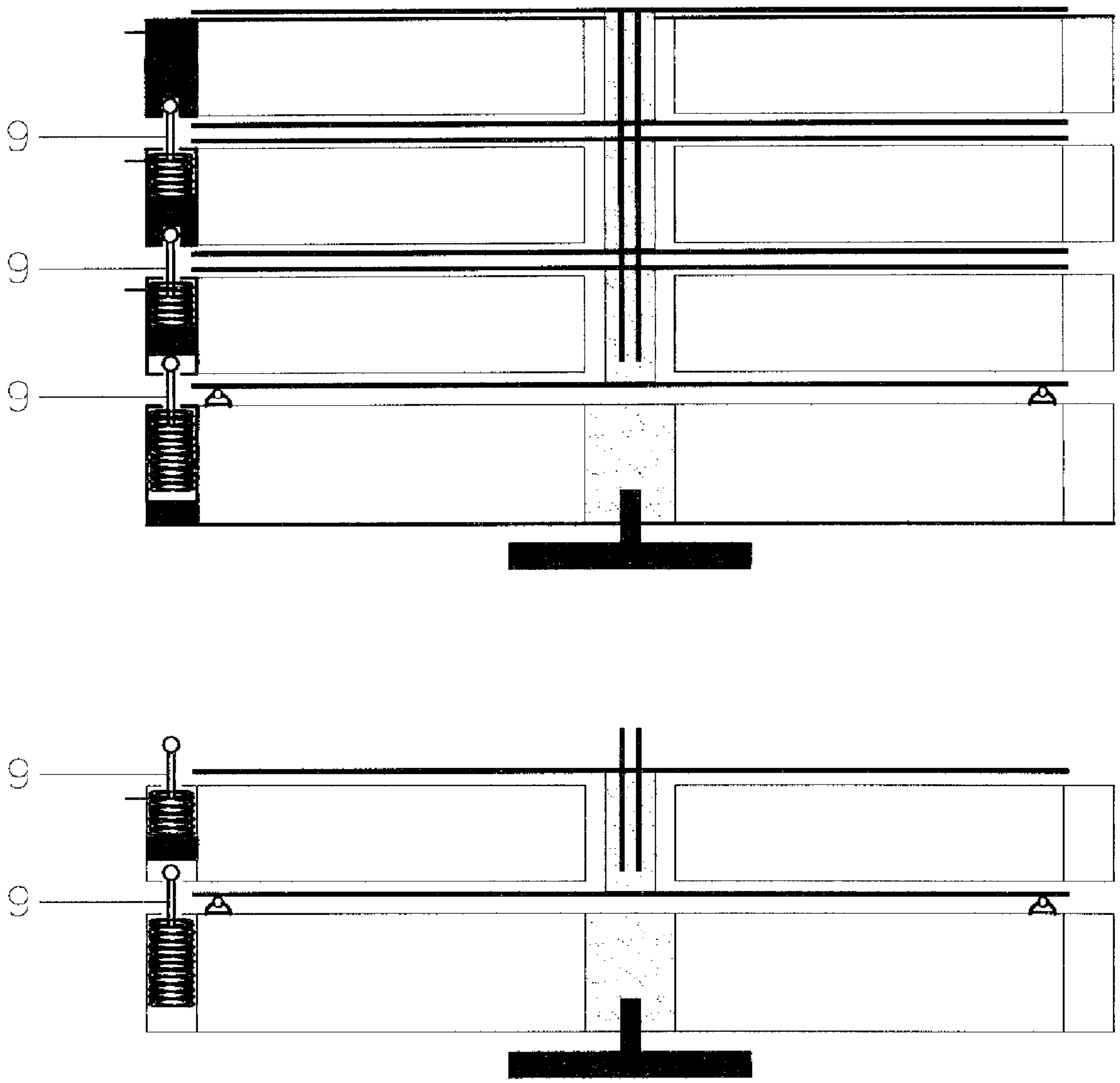
FIG. 2 is a pictorial view of a fixed in place integrated modular dispensing wheel system of the automatic medication dispenser of FIG. 1*a*. The drawing shows a moving medication dispensing wheel within a fixed in place and stationary modular dispensing wheel.

The front panel 15 houses a red circular push button compliance button 17. This button is located in the center of the display panel and under the electronic LCD 16. The circular red flashing-push button light 18 (approximately 0.7 cm in diameter and 0.3 cm×depth) flashes when the patient's medication has been dispensed. After the patient takes their medication they will push this flashing red circular compliance button 17. Located directly under the circular red flashing compliance button is a rectangular shaped yellow indicator light LED 19 (2 cm in length×0.5 cm in width×0.2 cm thick) that activates if a malfunction occurs in its sequencing pattern. The yellow light displays the message DANGER GET Help. If it lights up the patient will call a family member and or caregiver for assistance. FIG. 2 is a pictorial view of the integrated modular dispensing wheel system of the caregiver personal-portable and homebound-institutional automatic medication of FIG. 1.

FIG. 1*c* is a top view of a dispensing wheel 18.

Figure 3:
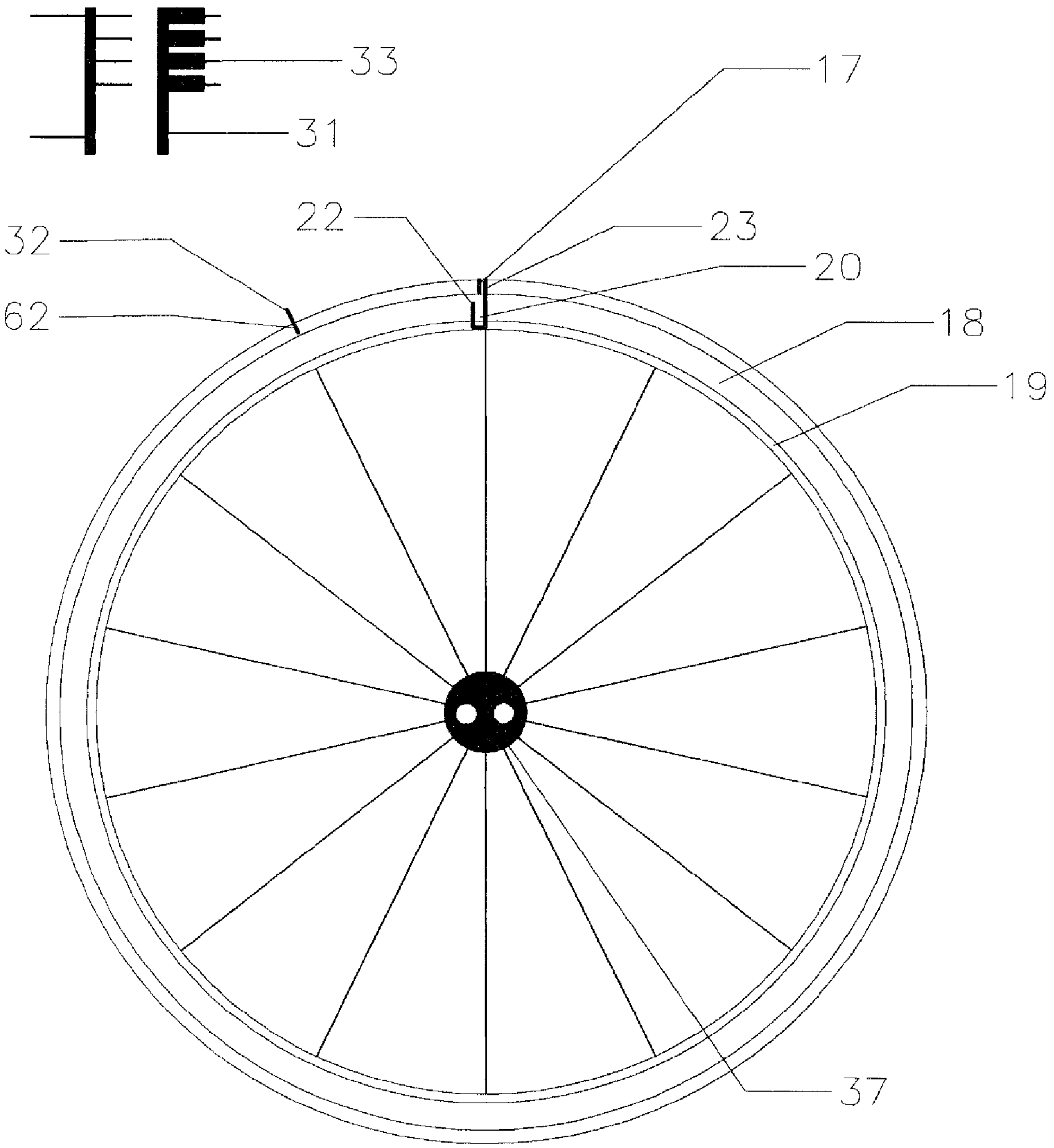
FIG. 3 is a detailed view of the integrated dispensing wheel's metallic magnetic probe, the groove the magnetic probe travels in, and the entrapment room with the entrapment door and a magnetic a wall of FIG. 2. These structures will automatically interconnect and interlock one dispensing wheel with another dispensing wheel.

FIG. 3 is a detailed view of the first integrated modular dispensing wheel 21 (approximately 11.8 cm in diameter×1 to 1.5 cm in height). It is the drive wheel for all of the vertically stacked dispensing wheels 21 above. It consists of the following parts: a magnetic probe, a groove for the magnetic probe to travels in, and an entrapment room located in this groove. The entrapment room is composed of a door and a magnetic wall. The flat magnetic probe 38 (approximately 0.2 cm width×0.4 cm height×0.2 cm thick) is attached to the top and outside wall of the first dispensing wheel 23, and at the proximal wall of its first dispensing unit is a cut out groove that encircles the base of the second dispensing wheel above. The magnetic probe 38 from the top of the first dispensing wheel 23 travels around and through this cut out groove. The dimensions of the cut out groove in the preferred embodiment are approximately 0.4 cm in width×0.5 cm in depth). The width of the base and outside wall is approximately 1 cm. The groove is cut into this base. In this example, the magnetic probe 38 on the top of the first dispensing wheel will travel through the cut out groove at the base of the second dispensing wheel above FIG. 3 Located within this cut out groove is an entrapment room.

The entrapment room 36 is located at the base of dispensing wheel number two. The entrapment room is located just before and below the distal wall of the first medication filled dispensing unit 1 of dispensing wheel number two above. The entrapment room has a door 41 and a magnetic plate 39. The magnetic plate 39 is directly under the distal or proximal wall of the first dispensing unit of dispensing wheel number two above. The entrapment door 25 extends laterally across and near the top of the entrapment room 36. The entrapment door 25 will extend laterally (approximately ¾ quarter) of the way across the entrapment room 39 from either the outside wall-in or the inside wall-out.

Figure 4:
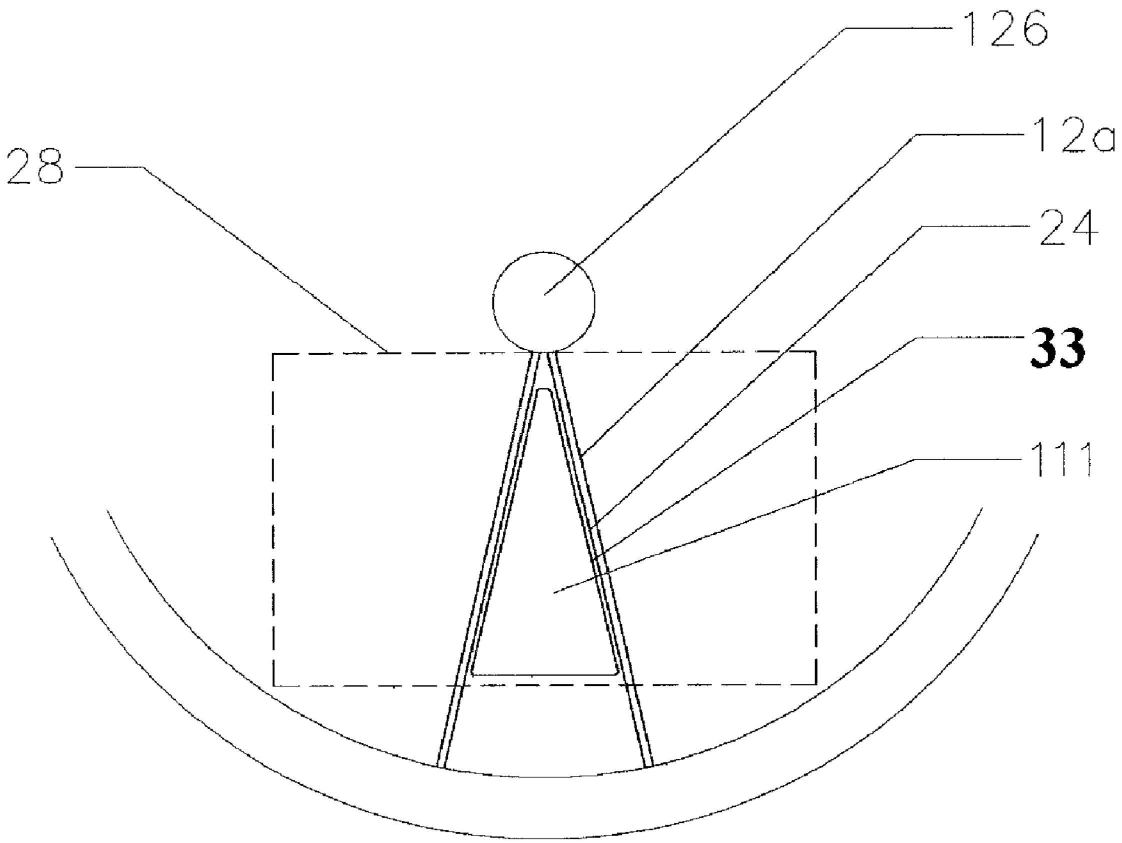
FIG. 4 is a pictorial and detailed view of the first dispensing wheel and its first V shaped dispensing unit. Enclosed within the first V shaped dispensing unit is the first V shaped medication container.

The entrapment door 25 is a thin, flexible, and rectangular shaped object made out of metal. The metallic magnetic probe on top of the first dispensing wheel will pass through the door of the entrapment room 36 and become attached to its the magnetic wall. FIG. 4 is a pictorial and detailed view of the V shaped cut 122 out dispensing unit 32 on the first dispensing floor 23, a triangular V shape medication container 111 (smaller than the V shaped cut out dispensing unit on the dispensing floor), a dispensing draw or *shallow semicircular medication cup 111 at the base of the dispenser 1.

As the first dispensing wheel turns one preprogrammed dispensing unit 32 the triangular medication container 111 (and the medications contained within it), will fall through the V shaped cut out dispensing unit on the first dispensing floor and down a clear vertical 16 pathway into either a dispensing draw or a shallow semicircular dispensing cup at the base of the dispenser 1.

Figure 5:
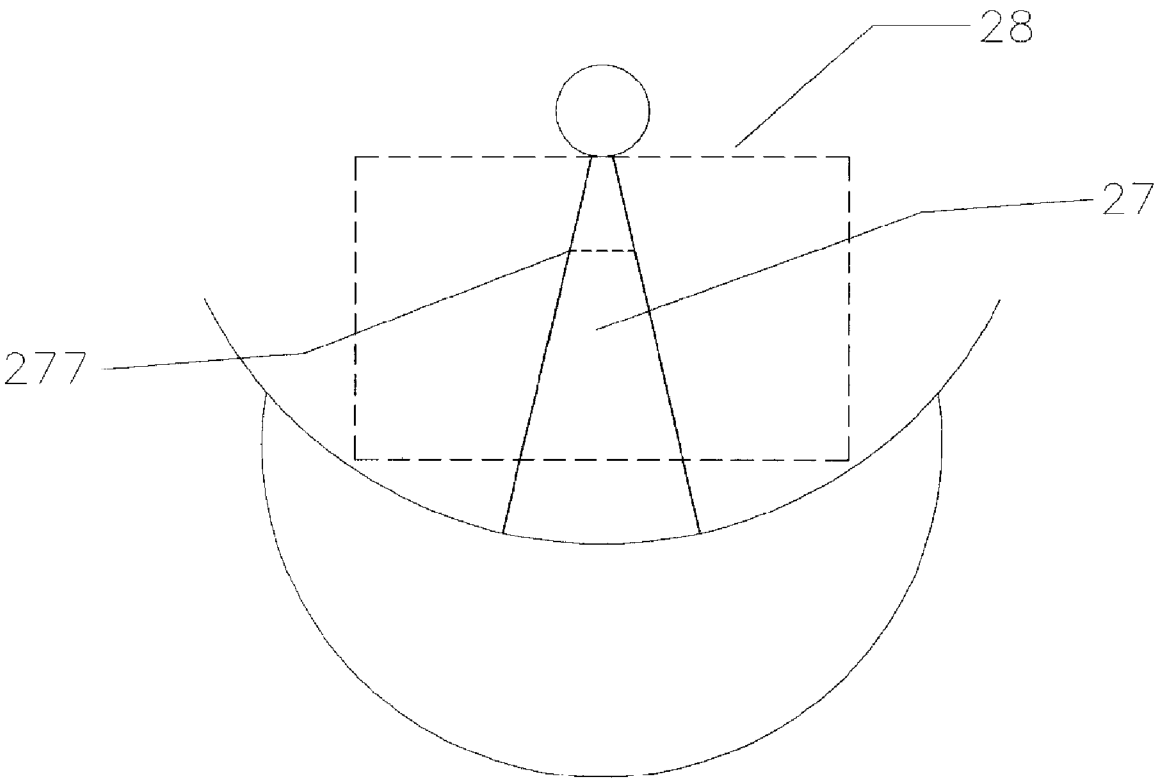
FIG. 5 is a pictorial and detailed view of the oversized door that leads to a structure and a means for securing the dispensed medication.

FIG. 5 is a frontal and pictorial view of the over sized door to the medication dispensing draw inside the housing of the dispenser, a spring loaded hinge or hinges for the dispenser's medication dispensing door, an over sized medication draw inside the housing of the dispenser, is a shallow semicircular medication dispensing cup, an enclosed inclined slide that's attached to the top 29 and back wall of the containment room for the medication draw.

The top wall of the containment room is attached to the bottom of the parts attachment floor above. In the preferred embodiment, there is a key and lock for the medication dispensing door. The spring loaded hinges or hinges will snap the door to the medication draw shut. The medication draw is located behind the dispenser's door and inside the housing 12 of the dispenser 1. The door is located next to the operating-display panel. The medication draw is located behind this door and inside the dispenser 1. The shallow semicircular dispensing cup is an extension of the base of the dispenser 1.

When a V shaped medication container 111 is dispensed it will slide down the inclined chute 277 and into the semicircular cup at the base of the dispenser. The chute 277 has a vertical wall on each of its sides. This will prevent the medication container from falling off the inclined slide 27. The top end of this slide 27 is connected to the top of the back wall 28 of the containment room for the medication draw. The top of the containment room will be secured to the bottom of the parts attachment floor. The medication draw will slide in and out of the dispenser 1. It will slides in and out on the floor of the dispenser (the base of the dispenser 1). The thickness of the base allows the door and draw to be slightly elevated from the bottom of the base. The door will have an indented handle. The medication draw will have protruding horizontal handle.

Figure 6:
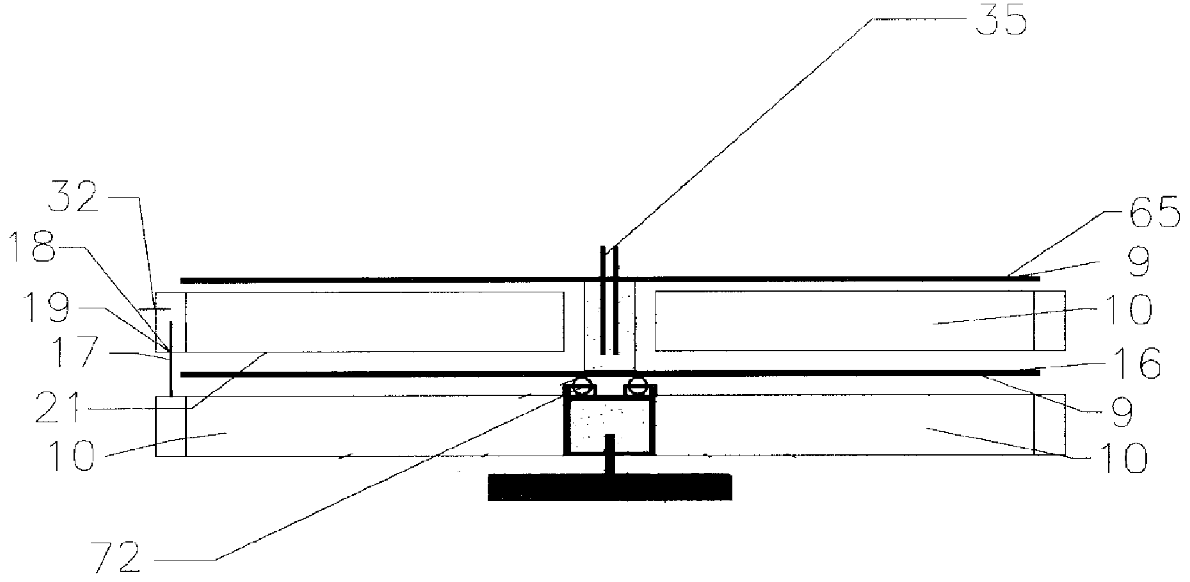
FIG. 6 is a pictorial and detailed view of the metallic dispensing bar and its attached thin flexible metallic probes and or the miniature solenoids of FIG. 1. This structure holds the vertically stacked dispensing wheels in a specific and fixed position within the dispenser.
Figure 7:
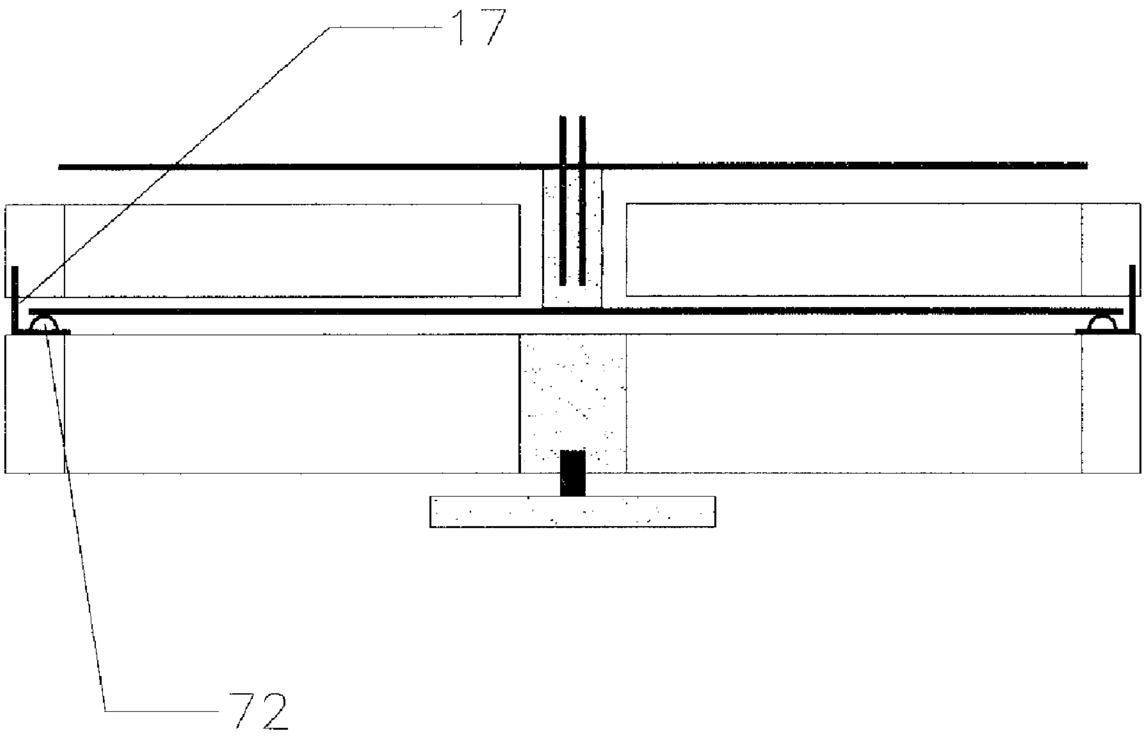
FIG. 7 is a pictorial and detailed view of a fixed in place modular dispensing wheel system with two metallic rods that extend vertically down from the center and inside wall of the top half of the dispensers housing: and its two corresponding vertical receiving holes located at the top and center of each vertically stacked modular dispensing wheel of FIG. 1*b*.

FIG. 6 shows the flat metallic dispensing bar 31 and its attached *thin flexible metallic probes 32 or miniature solenoids 48. The flat metallic bar is attached to the U shaped structure on top of the bottom half of the dispenser 1. The flat metallic bar is [*](approximately *4 cm. in length×1 cm wide×0.2 cm thick.). The flat metallic bar extends down (approximately *1 cm.) from this U shaped structure. FIG. 7 is a pictorial and detailed view of the integrated modular dispensing wheel system of drawing FIG. 2 with two thin metallic rods 35 extending vertically down from the center and inside wall of the top half of the dispenser's housing 12 and its two corresponding vertical receiving holes located at the top and center of each vertically stacked modular dispensing wheel. The rods extend vertically down to the top of the first dispensing wheel; but they don't make contact with the top of the first dispensing wheel. This specific structure will hold the modular dispensing wheels and their cut out V shaped dispensing units in a specific and fixed 17 position. The V shaped cut out on the top and bottom of each vertically stacked modular dispensing wheel, a dispensed and vertically aligned dispensing unit, the V shaped cut dispensing unit on the first dispensing floor, and the medication draw or the slide to the shallow semicircular dispensing cup at the base of the dispenser will be vertically aligned with one another.

Description—Static

Referring to the drawings, wherein like characters represent like or corresponding parts throughout the several views, one sees in FIG. 1. a view of the caregiver automatic medication dispenser and its interrelated parts. In an embodiment of the invention there could be an optional miniature television camera 38 that maybe mounted on the top and middle of the dispenser's top. The invention could have miniature or small rectangular shaped stepper motor 15 with a square vertical male geared shaft that extends up vertically into a slightly larger square geared female receptor in the center of the first dispensing wheel. This geared female receptor extends through the center of the first dispensing wheel.

The first dispensing wheel is the drive wheel. It will turn all of the vertically stacked dispensing wheels above. There is another means to interconnect the shaft of the steeper motor with the first (drive) dispensing wheel above. The top part of this shaft will have two and or four vertical interlocking and protruding male ridges that fits into the corresponding two and or four female vertical grooves at the bottom and center of the first dispensing wheel. The female grooves extend up into the center of the first dispensing wheel. There is the first dispensing floor that's shaped like an upside down cake baking pan. The outer wall of this first dispensing floor will be attached to the lower part of the flat metallic dispensing bar 31. A parts attachment floor is a right side up like cake backing pan with a diameter slightly less than the upside down dispensing floor. The difference in size enables the wall of the parts attachment floor to fit tightly inside the wall of the first dispensing floor. This will enable the space between the first and second floor to be adjustable. The space between the two floors can be either increased and or decreased. The distance between the two floors will be adjusted to accommodate the stepper motor 15.

After the steeper motor 15 is in place, the first the two floors will be secured together and then secured to the lower part of the flat vertical dispensing bar 31. The common wall between the first dispensing floor and the parts attachment floor will be attached to one another and then attached to the flat metallic dispensing bar 31. They can be attached at any given or required point on the lower part of the flat metallic dispensing bar 31. They can be attached and secure together with nuts, bolts, and lock washers or any other attachment means.

The bottom of the parts attachment floor 47 can be used to attach some of the electronic components. The first medication dispensing floor will have a very small circular cut out hole in its exact center. The shaft of the stepper motor 15 will protrude through this small cut out circle. The shaft of the stepper motor 15 will be connecting to the first dispensing wheel above. The stepper motor 15 will have two side extensions with vertical attachment holes on its housing. The attachment floor will have two corresponding attachment holes.

The holes in the housing of the two extensions of the stepper motor and the holes on the attachment floor will be aligned with one another and then will be bolted together.

The timing mechanism is a microprocessor with the watch dog timer 59. FIG. 3 is a dispensing wheel with its magnetic probe with a connector for a plug in co-axial cable for an online compliance computer. There are the bolts, lock washers, nuts or rivets that secure the first dispensing floor and the parts attachment floor to the flat vertical dispensing bar 31. FIG. 6 is the flat metallic dispensing bar 31 (approximately 4 cm×height, 1 cm×width, 0.2×thick) with a series of vertically attached thin metallic probes 32 or small-miniature solenoids 33. The thin flexible metallic probes 31 or miniature solenoids 33 are vertically aligned and equidistant apart on the flat metallic dispensing bar 31 of FIG. 6. The thin flexible metallic probe or arm from the solenoid will extend into a vertical cut out groove o the outside wall of each vertically stacked medication dispensing wheel. The probes or solenoids will enter at a point that is about three quarters of the way up the vertical cut out groove of each dispensing wheel.

The flat metallic bar 31 with its attached probes or solenoid arms is attached to the inside wall of the inside part of the U shaped top of the bottom half of the dispenser 1. The flat metallic bar 31 is attached at a point on the U shaped top one dispensing unit behind or before the dispensing draw or shallow semicircular cup at the base of the dispenser 1. The probes and arms will hold the individual dispensing wheels in a specific and fixed position until they are automatically dispensed one dispensing wheel at a time. FIG. 3 shows the first medication dispensing wheel. In the preferred embodiment, the dispensing wheel is (approximately 12 cm in diameter×[1 to 1.5] in height) with sixteen individual V shaped dispensing units with fourteen dispensing units. The medication dispensing wheel can be custom designed. The number and size of the dispensing units a can be custom designed to fulfill the dispensing needs of healthcare institutions and individual patients. Each V shaped dispensing unit of a sixteen unit dispensing wheel (12 cm diameter×1.5 or 1 cm in height) has the following measurements: the sides of each of the V shaped dispensing units are (approximately 5.8 cm. in length, 1 or 1.5 cm in height and a width of about 1 cm) across its rounded outer wall (circumference); and a small square vertical shaft through the center of the first or drive dispensing wheel. The base of each dispensing unit is approximately 1 cm. in width.

The individual dispensing units for the fourteen unit dispensing wheel will be larger than the dispensing unit for the sixteen unit dispensing wheel. A magnetic probe is located on the top outer wall of the dispensing wheel. It is located at the *proximal or distal wall of the number one dispensing unit of the vertically stacked dispensing wheels. FIG. 2 shows the fixed in place horizontal and sideway U shaped modular dispensing wheel. The modular dispensing wheel houses the medication dispensing wheel FIG. 3 (a wheel within a wheel). The top ceiling and bottom dispensing floor 23 of the horizontal U shaped modular dispensing wheel extends out toward the outside wall of the dispenser 1. The diameter of the top ceiling and bottom floor of the modular wheel is (approximately 1 cm) less that the diameter of the medication dispensing wheel.

Each modular side way or horizontal U shaped dispensing wheel has a cut out V shaped dispensing unit on its top ceiling and bottom floor. The V shaped cut outs of all of the vertically stacked modular dispensing wheels are vertically aligned with one another. The vertical alignment of the V shaped cut out unit of these vertically stacked modular dispensing wheels will form a clear vertical pathway to the medication dispensing draw or the shallow semicircular dispensing cup at the base of the dispenser.

When a V shaped dispensing unit of a dispensing wheel, and (the smaller V shaped medication container 111 within this V shaped dispensing unit) moves a distance of one preprogrammed dispensing unit and over top of a V shaped cut out on the floor of a vertically stacked modular dispensing wheel, the smaller V shaped medication container will fall out of the V shaped dispensing unit and down a clear pathway to the medication dispensing draw or the slide to the shallow semicircular dispensing cup at the base of the dispenser. The modular dispensing wheels (not the medication dispensing wheels) are being held in a specific, fixed, position within the dispenser by two vertical rods 35 attached to the top and center of the inside wall of the dispenser's top or cover. These two thin vertical rods will pass through two vertical holes in the top and center of each vertically stacked modular dispensing wheel. These two vertical rods are attached to the inside wall of the top half of the dispenser's housing. The two vertical holes on top of each vertically stacked modular dispensing wheel will be precisely positioned and cut out. The specific positioning of the vertical cut out holes in the center of the stacked modular dispensing wheels will automatically align the vertical V shaped cut out dispensing units on the top and bottom of the modular dispensing wheels directly over top of the medication dispensing draw at the base of the dispenser 1.

The dispenser has an emergency yellow light that flashes when there is a dispenser malfunction. The dispenser 1 has an electric chord receptor. FIG. 1*b* displays a microprocessor or watch dog timer battery that will activate the back up batteries when there is a power failure or malfunction. The back up batteries will activate the emergency response phone calls via modem etc. A microchip or the internal microprocessor will automatically and sequentially count each unit of medication dispensed. After the patient takes their medication they will push the flashing red compliance button. When the patient pushes the flashing red compliance button the microprocessor or the sequential counting chip will record the patient's compliance response. If the patient fails to push the compliance button on two consecutive scheduled dispensing times the microprocessor will signal the modem 67 to make preprogrammed emergency phone calls to family members or a caregiver. There is an emergency red panic button 117. When the panic button 117 is pushed a signal will be sent directly to the microprocessor. The microprocessor will automatically initiate the pre-programmed emergency phone calls.

FIG. 1 shows the two halves of the circular and cylindrical housing of the dispenser 1. The dispenser has a flat base with an attached rubber mat. The flat base is circular with a diameter of (approximately 10 cm). The bottom half of the dispenser's housing has a U shaped rim on top. A locking mechanism will be located on the inner part of the outer wall of the U shaped rim of the dispenser.

Description—Operational

The following is an operational description of the preferred embodiment of the dispenser. A lap top computer will program the microprocessor. The computer will be connected to the medication dispenser at a plug in receptor on the lower half of the medication dispenser. The lap top computer will enter preprogrammed dispensing directions into the microprocessor. When the start button 68 is pushed the timed dispensing program of the microprocessor will be activated.

A timer or timing mechanism will activate the programmed timing directions of the microprocessor. The microprocessor will coordinate and execute the various operating systems. The timing program of the microprocessor will activate the battery.

The battery will activate the stepper motor and its gear shaft. The geared shaft 1 of the stepper motor will turn the interconnecting gear of the first dispensing wheel one programmed dispensing unit at a time. For example, when a preprogrammed dispensing signal activates the steeper motor of a sixteen unit dispensing wheel, it will turn the dispensing wheel twenty two point five degrees or one dispensing unit. When a programmed dispensing signal activates the steeper motor of a fourteen unit dispensing wheel, it will turn the dispensing wheel a distance of twenty five point four degrees or one dispensing unit. When the medication wheel is turned one programmed dispensing unit the medication contained in the first dispensing unit or the triangular dispensing container in the first V shaped dispensing unit of the first dispensing wheel FIG. 3 will be moved one V shaped dispensing unit over top of the V shaped cut out dispensing unit on the first dispensing floor. The triangular medication container in the first dispensing unit will fall through the clear vertical pathway of the vertically stacked modular dispensing wheel system, and into the medication dispensing draw; or on to the enclosed slide of the shallow semicircular medication cup, directly below and at the base of the dispenser.

In the preferred embodiment, as the medication is being dispensed the microprocessor as shown in FIG. 1*b* the dispenser 1 will initiate a variety of dispensing signals from a variety of signaling devices located at the bottom half of the dispenser: 1.(a) speaker 44 and voice chip 45, buzzer 70, a flashing red light-compliance button 17 and or a signaling device worn by the patient. The signaling process will be persistent and continuous. The voice chip will deliver a dispensing message to the speaker 44. The message will say "your medication has been dispensed, please take your medication; and then push the flashing red compliance button". The voice message of the dispenser and the remote signaling device worn by the patient continue for thirty to forty five minutes. The signaling will be repeated every minute for five minutes. Then every five minutes for the remaining time for this cycle.

When the patient receives the dispensing signals they will go over to their dispenser and open the dispenser's door, take out the medication draw, consume their medication, put the draw back into the dispenser 1, close the door, and then push the red flashing compliance button 17. When the patient pushes the red flashing compliance button the voice chip will say, “thank you; now please put the medication draw back into the dispenser, and close the door”. When the patient pushes the red flash compliance button a signal will be sent to the microprocessor or sequential counting chip. They will keep a running count and record of the number of medication doses dispensed. If the patient fails to respond to the signaling process within forty five minutes, the signaling will stop; but the timed dispensing process will continue.

If the patient fails to push the flashing red compliance button after two consecutive medication deliveries, the sequential counting program of the microprocessor will send a signal to the modem and the programmed emergency telephone calls will be initiated. When a family member receives an emergency response signal they will go over to the patient’s residence and investigate for a possible patient emergency. After attending to the patient the caregiver will go over to the medication dispenser 1 and push the flashing red medication compliance button. When the caregiver pushes this button the emergency response system will be deactivated and then automatically reactivated. If no one responds to the emergency phone calls, and the flashing red compliance button isn’t pushed within thirty to forty five minutes, the microprocessor will signal the modem to call the 911 emergency telephone number. The microprocessor will activate the voice chip and a prerecorded message will be played. The programming of the microprocessor will continue to initiate the programmed dispensing directions until all of the medication filled dispensing units of the first dispensing wheel are dispensed.

As the first dispensing wheel is in the process of dispensing its last unit dose of medication, its magnetic probe 49 will pass through the entrapment door 36 of the second dispensing wheel above. As the magnetic probe 49 moves into the entrapment room 36 the entrapment door will snap shut and entrap the magnetic probe 49. The forward momentum of the first dispensing wheel, and the magnetic attraction of the probe from the top of the first dispensing wheel and the magnetic attraction of the magnetic wall of the entrapment room at the base of the number two dispensing wheel above, will entrap the magnetic probe 49 in the entrapment room 36. The entrapment of the magnetic probe will interconnect or enjoin the first and second dispensing wheel. The enjoined dispensing wheels will now move as a single and combined dispensing wheel.

On the next scheduled dispensing time the enjoined dispensing wheel will be moved forward one dispensing unit by the forward movement of the probe of the first or drive dispensing wheel. The forward movement of the drive or first dispensing wheel and its interconnecting probe is related to the forward movement of the interconnected and geared male shaft of the stepper motor and the female receiving gear of the first or drive dispensing wheel.

As they begin to move forward one dispensing unit the thin flexible metallic probe 32, extending into the vertical groove on the outside wall of the second dispensing wheel, will bend over and release the second dispensing wheel. Or, if the probe of a miniature solenoid is holding the second dispensing wheel in place, it will be pulled out of the vertical groove on the outside wall of the second dispensing wheel. When the probe is pulled out of the vertical groove on the second dispensing wheel the single and combined dispensing wheel will move forward one dispensing unit. When they move forward one dispensing unit the V shaped medication container 111 in the first dispensing unit of the second dispensing wheel will move forward and over top of the V shaped cut 112 out dispensing unit on the floor of the second dispensing floor, the V shaped medication container 111 will fall through and down a clear vertical pathway and into a medication dispensing draw at the base of the dispenser directly below; and or the V shaped medication container 111 will slide down an inclined and diagonal planed floor at the bottom of this vertical pathway, and into the shallow semicircular medication dispensing cup at the base of the dispenser 1.

This programmed dispensing process will continue autonomously and automatically until all of the vertically stacked modular dispensing wheels are dispensed. When the top and last vertically stacked dispensing wheel dispenses all but six of its remaining dispensing units, the programming of the microprocessor will activate a *voice chip. The voice chip will tell the patient t “your dispenser has only six more doses of medication, please refill your medication dispenser now!”.

The patient will either refill the dispenser 1 themselves or have a family member fill it, and or have their pharmacist refill it. A pharmacist’s assistant can make a home visit and refill the dispenser. The design of the integrated modular dispensing wheel will simplify the refilling process. The patient, family member, caregiver and or the pharmacist will unlock the dispenser and lift off the top half of the dispenser’s housing. Then they will lift the first integrated modular dispensing wheel system as shown in FIG. 3 out of the dispenser’s housing, turn if upside down, and then align the vertical center hole of the integrated modular wheel with the vertical shaft of a refilling device.

The diameter of the base of the refilling device will be slightly smaller than the diameter of the modular dispensing wheel. The height of the base of the refilling device will be high enough for the magnetic probe of the dispensing wheel to clear the dispensing table’s floor. Now, the patient will lower the system down on to the floor of the refilling device. The patient will rotate the body of the dispensing system until it is stopped by the smaller raised V shaped dispensing unit on the floor of the loading device.

The V shaped dispensing unit of the modular dispensing wheel will interconnect and interlock with the smaller V shaped dispensing unit of the floor of the loading device. The height of this V shaped raised unit will be tall enough to stop the modular dispensing wheel’s housing from moving. The dispensing wheel of the modular dispensing wheel will be free to turn. The patient and or caregiver will be grasp the magnetic probe and turn the dispensing wheel as they refill the medication dispensing wheel. To start loading process the patient and or caregiver will move the probe from the dispensing wheel to the proximal wall of the V shaped cut out of the modular dispensing wheel. Then place the first medication filled V shaped medication container 111 into the first dispensing unit of the first dispensing wheel: the morning dose to be dispensed between 8:30 to 9:30. The patient will turn the dispensing wheel one V shaped dispensing unit and place the second V shaped container and its prescribed medication mix into the second dispensing unit: the afternoon dose between 1:30 and 2:30. The patient will turn the dispensing wheel one V shaped dispensing unit and place the third V shaped medication container and its prescribed medication mix into the third dispensing unit: the evening dose of medication between 5:30 and 6:30. The first day’s medication has been loaded into the integrated modular dispensing wheel system. The patient, family member or pharmacist will continue to fill the dispenser one dispensing unit at a time, and one dispensing wheel at a time, and until all of the prescribed doses of medication have been loaded into the dispenser. The unique capability to vertically stack, hold in place, and then to dispense numerous vertically stacked integrated modular dispensing wheels will enable a nearly unlimited supply of prescribed medications to be dispensed for a nearly unlimited period of time. After the dispenser has been refilled the top will put back on and locked.

Referring now to the computer programs flow chart of the caregiver dual purpose automatic medication dispenser, the programmed delivery sequence is shown. Assume that all times and alarms have been initialized.

1—At the correct dosing times shown on the display the main program commences making various decisions the micro-processor 215. Various testing alarms are tested and set-off if needed acoustic signaling including the human voice 240. Also, the sensors are checked for discrepancies.

2—If the sound is ignored by the patient minute up to a programmed interval 30 to 60 minutes the volume of the sound is increased every five minutes.

3—Simultaneously, the red flashing compliance button 17 and stepper motor are activated and ready for use.

4—The microprocessor 215 and/or timing device will signal the steeper motor 15. to turn the dispensing wheel one dispensing unit and the V shaped medication container 111 will fall into the medication draw or shallow semicircular dispensing cup at the base of the dispenser.

5. After the V shaped container is automatically dispensed the number and verbal dispensing signaling will commence for the medication pick up.

6. The visual and acoustic signaling is terminated.

7. The compliance memory recorder, the Watch Dog Timer

8. The automated steeper motor 15. is de-energized and the cycle is restarted for the next delivery.

9. If the patient doesn't push the compliance button after one hour family members or a caregiver can be alerted through the RS-232 telephone modem 39.

10—Also, container on the top of the dispenser is a small video camera to view the patient taking their medication. It can be used to assist patient who have difficulty complying with their medication schedule.

Drawing Figures—Second Embodiment

Figure 8:
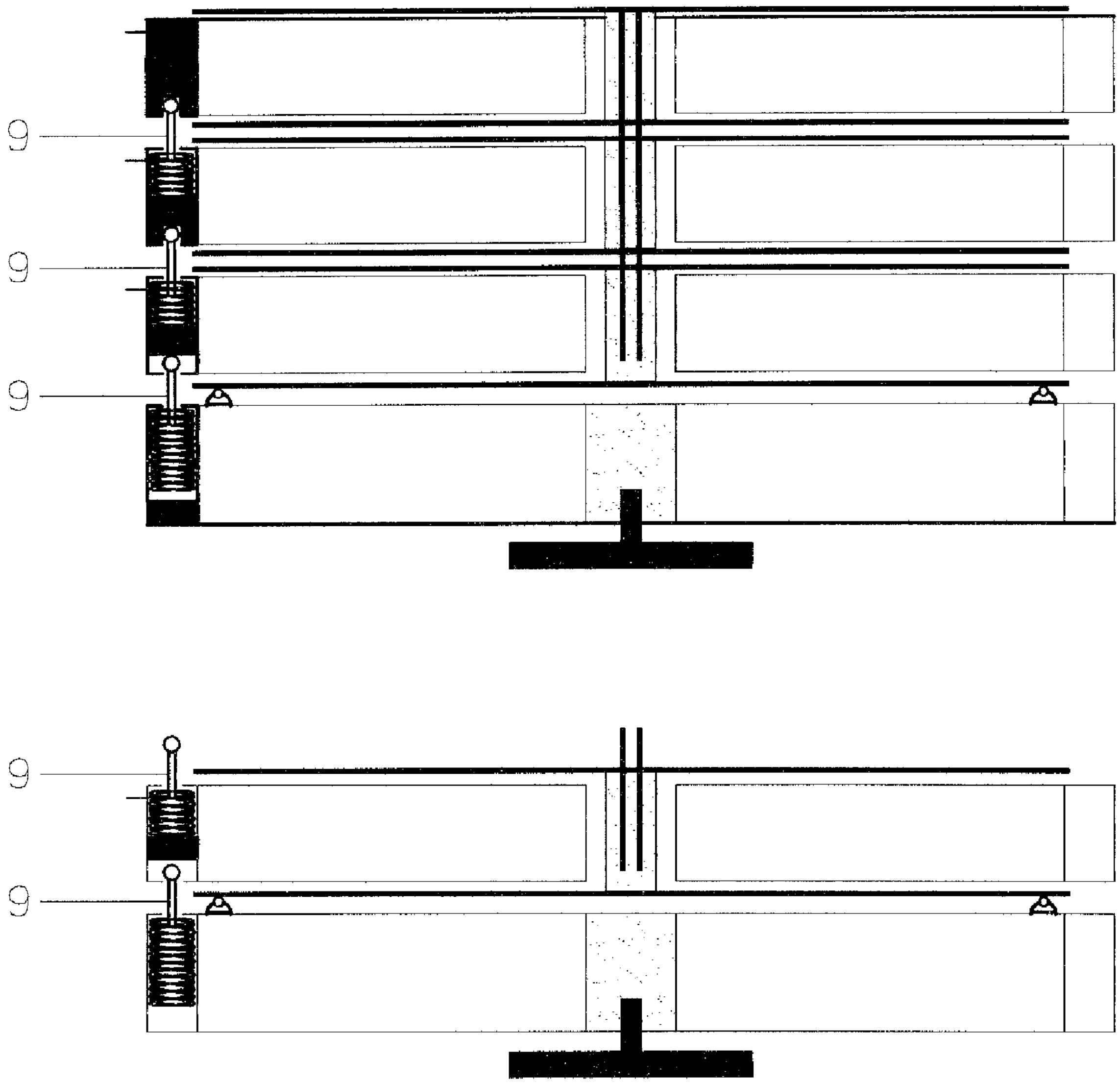
FIG. 8 is a second embodiment of the dispenser.

Most of the structures and operations of the second embodiment of the dispenser 1 are the same. The only difference between the first embodiment and the second embodiment as shown in FIG. 8 are the means whereby one vertically stacked dispensing wheel automatically becomes interconnect and interlocked with another vertically stacked dispensing wheel. This single version of the dispenser 1 has two means whereby one vertically stacked dispensing wheel can be automatically interconnected and interlocked with another vertically stacked dispensing wheel either above or below. In the first version, the spring loaded interconnecting probe located on the outside wall at the base of the top or second dispensing wheel will snap down into a vertical interconnecting entrapment hole at the top outside wall of the first dispensing wheel below.

In the second version, the spring loaded interconnecting probe located on the top of the outside wall of the first dispensing wheel will pop up into a vertical interconnecting entrapment hole on the bottom outside wall and base of dispensing wheel number two above. The spring loaded probe is housed within a shallow containment hole. The spring is attached to bottom of the shallow containment hole. The probe is protruding out from the top of the containment hole. When a dispensing wheel is place on top, and then the dispenser is close and locked, the spring from the probe will be compressed. The compressed statue of the spring will create the potential energy to snap or propel the attached probe from the top of the first dispensing wheel up and into the entrapment hole at the base of the second dispensing wheel above or the potential energy of the entrapment probe from the base of the second dispensing wheel will pop the spring loaded probe down and into the entrapment hole on the top of the first dispensing wheel below.

The probe has a ball bearing 72 that will enable it to turn as it moves through a shallow groove that encircles either the top out side wall at the base of the second dispensing wheel or the shallow groove on the top outside wall of the first dispensing wheel below. The tension on the spring loaded probe will pop the probe into a corresponding vertical entrapment hole as it moves over top of the entrapment hole. There will be a ball bearing 72 at the end of the pop up or pop down spring loaded probe. The ball bearing 72 will enable the probe to move across the surface either the top outer wall or the bottom outer wall of the dispensing wheel that is dispensing the medication. When the dispensing wheel that has just dispensed its last medication filled dispensing unit passes over top of the entrapment hole of the next vertically stacked dispensing wheel either the spring loaded probe at the base of dispensing wheel above will snap down or the spring loaded probe on the top of dispensing wheel number one will pop up and into the dispensing hole. This will automatically interconnected and interlock the two dispensing wheels together. On the next dispensing time the two interconnected and interlocked dispensing wheel will move together as a single and combined dispensing wheel. As they move forward the distance of one preprogrammed dispensing unit the medication contained within the first dispensing unit of the dispensing wheel above will be dispensed. The V shaped medication container 111 will fall through the V shaped cut dispensing unit on the dispensing floor and down a clear vertical pathway to the dispensing draw or shallow semicircular medication cup at the base of the dispenser. From this point forward the static and operational description of the second version is the same as the preferred embodiment.

Drawing Figures—Third Embodiment

The third embodiment basically involves the same static and operational features and components as the first and second embodiment of the dispenser. The main differences are the components in the upper half of the dispenser are connect to a dispensing rod that suspends down from the center and inside wall of the dispenser's top, and the first dispensing floor that is connected to the outside of the inside wall of the U shaped top of the bottom half of the dispenser's housing. The parts right side up dispensing parts attachment floor's diameter is slightly smaller than the upside down cake pan like first dispensing floor. Therefore, the space between the two floors can be adjusted to accommodate the size of the stepper motor. T he dispensing parts that are connected to and or revolve around the dispensing rod are: 1) the dispensing floors that are attached to the rod 2) the medications wheels that turn on the dispensing floors 3) and the thin flexible dispensing rods 35 that hold the dispensing wheels in a fixed and specific position within the dispenser. A cover for the first dispensing wheel is a part of the dispensing rod. The cover is located at the bottom of the dispensing rod and covers the first dispensing wheel. The covers for all of the vertically stacked dispensing wheels are the dispensing floor of the dispensing floor immediately above. There is a cover for the top dispensing wheel. From this point forward the static and operational features and parts are basically the same as the first or second version of the dispenser 1.

There are numerous variations for the physical structure and position for the groove that the magnetic probe passes through. The dispensing wheel has a number of V shaped dispensing units that fan out from its small inner circle and or vertical holes at the center of the dispensing wheel. Each of the single V shaped dispensing units fan out from the center of the dispensing wheel. The two walls that fan out from the center of the dispensing wheel form-dispensing unit. A small portion of the base and or top will have a cut out vertical valley or groove. The magnetic probe will move around and through this cut out groove. A cut out groove can be cut through the V shaped walls of the dispensing units concentrically. Also, a number of cut out valleys can be concentrically cut out from the center of the dispensing wheel inner to the outer circumference of the dispensing wheel. Subsequently, the magnetic probe, entrapment door, and the magnetic wall can be placed in one of these concentric valleys.

There is still another new embodiment of this invention. It is a do it yourself and or self-assembly automatic dispenser kit. This do it yourself kit also introduces another new fastener invention.

CONCLUSIONS, RAMIFICATIONS, AND SCOPE

The caregiver automatic medication dispenser is the only single and dual purpose and combined personal portable and homebound-institutional dispensing system is the only single dual purpose single medication dispenser capable of dispensing medication to the broadest-diversified and most comprehensive groups of medical, psychiatric and special needs patients. As a homebound-institutional and bedside-table top dispenser it will dispenses medication to the homebound patient, patients in hospitals, assisted living facilities, nursing homes and in all other kinds of health related facilities. As a personal-portable dispenser it can be inconspicuously and conveniently carried by a patient while they are working, participating in their community, traveling, vacationing, and visiting friends and or family. The dispenser can be made the size of a compact disc player and or smaller. It can also be expanded to any sized desired by the patient and or prescribed by the physician. The dispenser can be easily modified to service the specialized dispensing needs of patients suffering from alcohol and or substance abuse, visual and or hearing impairments, emotional, neurological, and or memory impaired.

In addition, the dispenser can be used as the main part of an automated and integrated networking system that interconnects and communicates with the private physician, pharmacist, and patients in the community. It can also be used by the private physicians, institutional physicians, pharmacists, and nurses in hospitals, nursing homes and all other health related facilities. The physician, pharmacist, and nurse will be able to communicate and exchange information related to the dispensing and monitoring needs of their patients.

This dispensing and monitoring system will eliminate medication mistakes, cut costs, and increase productivity. By automating the present manual and labor intensive medication dispensing process healthcare providers will be able to successfully manage an historic and precedent setting healthcare crisis that will unfold over the next fifty plus years. For the first time in history the vast majority of the world's population will be senior citizens that are over the age of sixty five. Recent changes in corporate policy and government regulations mandates that this aging workforce will have to work for at least an additional ten plus years. This aging work force will have to work longer and harder; and therefore will experience a substantial increase in emotional, physical, and economic stress. Therefore, workers will have to rely on a substantial and sustained increase use of medication and healthcare services. The caregiver automatic personnel-portable automatic medication dispenser will enable this aging work force to successfully manage their healthcare needs. They will be to carry their personal and portable medication dispenser while they are at work, participating in their community, traveling, vacationing, and visiting their friends and family. The dispenser will actively assist the patient to actively manage their health problems, and illnesses related to the aging process. The dispenser will enable physicians to resolve many of the unresolved medication and medical treatment problems of the past twentieth century. And the caregiver will continue to meet these medical dispensing challenges in this twenty-first century.

Advantages:

From the description above, a number of advantages the personal portable and homebound-institutional dispenser becomes evident:

(a) The automatic medication dispenser and its dispensing system will eliminate medication mistakes made in hospitals, assisted living facilities, nursing homes, alcohol and substance abuse treatment facilities, specialized group homes for exceptional and special needs residents, residential treatment centers, and out patient clinics. It will prevent medication mistakes made by individual patients, family members, and caregivers that fill the medication dispenser. Medication mistakes will eventually be eliminated by the use of the dispenser 1, and its related inventions, and by the "one and only one pair of professionally trained hands"; the hands of a professionally trained pharmacist. Hospital and other healthcare related facilities can eliminate medication mistakes by having all medications dispensed in a central location within the dispensary. The professionally trained pharmacist would receive the physician's prescription, select the medications, fill the medication dispensing wheels, lock and label the dispenser and then have a pharmacist assistant deliver the filled dispenser to the patient. The assistant would check the identifying information on the patient's wrist band with the information on the dispenser. Then plug the dispenser in and connect it to a co-axial cable. The programmed dispensers will automatically dispense the patient's medications on a timely basis. The nurse will be able to monitor and assist the patient with the compliance computer and their personal communication system.

A recent article published in the "The Wall Street Journal, Friday, Jul. 26, 2002," by Laura Landro staff reporter; reported that the FDA held a conference relate to exploring the use of technology to help "curb medication errors" and mistakes. And to consider requiring hospitals to affix a bar code to drugs and the patient's ID in order to track prescriptions and dosages. Some hospitals and pharmaceutical companies have embraced the concept as a way to prevent potential "deadly medication mistakes" that lead to thousands of deaths a year. The Institute of Medicine said that preventable medical errors cause between 44,000 and 98,000 deaths a year. Jane Englebright, a vice president for quality at the Federal American Hospitals—HAC inc., with over one hundred and eight three hospitals, believes that a more integrated approach is needed. Susan Delbance of the Leapfrog Group stated, "eventually we will see the entire process automated."

The systems that were presented are good at preventing errors in the ordering phase but they can't control mistakes further along the patient-care chain. The automatic medication dispensing system is the only medication dispensing system that protects the patient throughout the entire patient-care chain. It integrates and safeguards all of the of the separate processes and or steps involved in the patient-care chain for dispensing medication. In addition, there are two related and supportive inventions that will reinforce and strengthen the mistake free operation of the caregiver dispensing system. A combination of these three dispensing and monitoring devices will eliminate medication mistakes. It would eliminate the manual and labor intensive process of dispensing a patient's medication.

(b) The dispenser will safely dispense medication to alcohol and substance abuse patients. For the first time, physician's will be able to safely medicate and treat alcohol and substance abuse patient for the underlying symptoms that initiated and presently maintains their substance abuse. This invention provides one of the missing links required for a real and sustainable "cure" for the substance abuse and alcoholism.

The dispenser is made out of stainless steel, can be locked, and will be serviced and dispensed by a pharmacist. The pharmacist will keep the key for the dispenser in a locked safe. This invention will provide a real and sustainable "cure" for alcohol and substance abuse. According to an article in the newspaper USA TODAY, Monday Sep. 30. 2002 three-fourths(75%) of the $5 billion a "year" spent imprisoning drug convicts goes to confine people who've never committed a violent crime. In the past ten years the prison population for substance abusers has surged from 40,000 to over 453,000. Based on the Justice Department(news—web sites) records and surveys the Sentencing Project finds that: * 74% of these prisoners no convictions for violence, * 27% have been convicted on simple possession charges "not selling" or intending to sell, * 58% have no history of violence or high-levels of drug dealing. Non violent offenders are serving 15 years or more. To build one cell a minimum charge of $50,000 and $20,000 to house one inmate. New York's law is equivalent to criminals who commit rape and manslaughter; 15 years and more. California's voters approved the release of non-violent offenders into treatment programs. They have already helped thousands and realized a cost savings of over $6.7 million dollars; every 1 dollar spent on treatment has saved 7 dollars in reduced crime and health costs. The state of Arizona is obtaining similar results. These programs plus "drug courts" have cut repeat offenders by 50 to 90%. Public support for these programs is 71% but vote sensitive politicians have not supported these changes.

(c) The dispenser can be used as main part of a three part integrated and comprehensive system that will enable the world's criminal justice systems and correctional facilities to pardon and release over one million alcohol and substance abuse inmates. Inmates that successfully complete this in house and short term treatment and evaluation program can earn and an early release and pardon. There are approximately one 450,000 alcohol and substance abuse prisoners in the United States. Twenty four thousand Australians die from alcohol and substance abuse each year. It has become the predominate killer of young Englishman. In Germany it is the leading cause of fatal motor vehicle accidents. The economic cost to the world's economy is hundreds of billions of dollars a year.

(d) The invention can be used safely, and without medication mistakes, automate the present manual, repetitive and labor intensive medication dispensing systems used in hospitals and all other health related facilities. Each patient will have their own bedside automatic medication dispenser. The dispenser will be filled by a pharmacist in the dispensary.

(e) This invention can provide personal and individual patient monitoring services within a healthcare facilities and at home. A miniaturized television camera can be mounted on top of the bed side and or home bound automatic medication dispenser. Home bound patients can also be monitored and assisted by the video camera mounted on top of their medication dispenser.

(f) The dispenser will provide a multi-systems approach to alert the patient, family members and or a caregiver when there is an emergency, dispenser malfunction, and or compliance problem.

(g) It will provide a fail safe system of last resort. If there is no response from the patient and or family members to an emergency and or malfunction signals the caregiver will automatically call the emergency response system of 911 and deliver a pre-recorded emergency response message.

(h) The dispenser can send dispensing signal to at patient when they are at a remote location from their dispenser.

(i) The dispenser will provide a special dispensing signal for sensory impaired patients and for patients with exceptional and special needs:

(j) The dispenser will provide an automatic medications dispenser kit that can be purchased and easily assembled by the patient. The parts for the dispenser will be able to be easily assembled and automatically snapped into place.

Although many features, functions, and advantages of the present invention have been described in this specification, together with details of the structure of specific embodiments thereof, the description as a whole is illustrative only, and substitutions may be made in detail, especially in matters of shape, dimension and arrangement of elements within the principles of the invention to the full extent indicated by the broad, general meaning of the terms in which the claims are expressed. Therefore, the point and scope of the appended claims should not be limited to the description of the preferred versions contained herein.

What is claimed is:

1. A medical dispenser comprising:

(a) a processor for transmitting and receiving information internal or external to the medical dispenser;

(b) a compliance button that transmits information to the processor;

(c) a plurality of dispensing wheels structured to include a plurality of dispensing units and the dispensing units are capable of holding at least one object to be dispensed, the plurality of dispensing wheels comprising:

a first dispensing wheel comprising:

a top wall, and a magnetic probe attached to the top wall; and a second dispensing wheel disposed above the first dispensing wheel, the second dispensing wheel comprising:

a base at a bottom of the second dispensing wheel, a groove in the base for the magnetic probe to travel within, and an entrapment room located in the groove, the entrapment room including a flexible metallic door and a magnetic wall; and (d) a vertical pathway that allows for the at least one object to travel from the plurality of dispensing wheels into a dispensing draw, wherein each dispensing wheel rotates a predetermined distance around a vertical axis in order to align each dispensing unit with the vertical pathway, and wherein when the magnetic probe in the groove aligns with the entrapment room the magnetic probe passes through the flexible metallic door of the entrapment room and becomes attached to the magnetic wall, such that magnetic attraction of the magnetic probe of the first dispensing wheel and the magnetic wall of the second dispensing wheel allows for both the first and second dispensing wheels to be enjoined and to move together as a single combined dispensing wheel.

2. The medical dispenser of claim 1, wherein the entrapment room is positioned in the second dispensing wheel before and below a wall of a first dispensing unit.

3. The medical dispenser of claim 1, wherein the door of the entrapment room extends laterally across and near a top of the entrapment room and closes to entrap the magnetic probe with the magnetic wall when the magnetic probe aligns with the entrapment room.

4. The medical dispenser of claim 3, wherein the door of the entrapment room extends laterally approximately ⁄3;4 of the way across the entrapment room from either an outside wall-in or an inside wall-out.

5. The medical dispenser of claim 1, further comprising:

(e) a motor for driving the rotation of the plurality of dispensing wheels; and (f) two rods that extend down from a top of a highest stacked dispensing wheel through each dispensing wheel stacked below the highest stacked dispensing wheel to the top wall of the first dispensing wheel.

6. The medical dispenser of claim 5, wherein the processor includes a clock mechanism that causes the motor to drive the rotation of the plurality of dispensing wheels around the vertical axis the predetermined distance at least one set time.

7. The medical dispenser of claim 5 further comprising, (g) a housing comprising:

a base with a skid proof rubber pad, a display area that comprises a display and the compliance button, and a door with a locking mechanism that closes off the dispensing drawer; and (h) a camera mounted on the top of the housing of the medication dispenser that can supply video to the processor.

8. The medical dispenser of claim 1, wherein each dispensing wheel of the plurality of dispensing wheels is separated from other dispensing wheels by a dispensing wheel floor.

9. The medical dispenser of claim 5, wherein:

the two rods are attached to the top and center of the inside wall of the top half of the dispenser housing; and the two rods extend through two receiving holes in each dispensing wheel to the top wall of the first dispensing wheel.

10. The medical dispenser of claim 5, further comprising:

a vertical dispensing bar coupled to a U-shaped top of the bottom half of the dispenser;

a plurality metallic probes coupled to the vertical dispensing bar; and a plurality of solenoids coupled to the vertical dispensing bar;

wherein the metallic probes and the solenoids extend horizontally out from the vertical dispensing bar; and wherein the metallic probes and the solenoids fit into a vertical cut out groove in the outer wall of a dispensing wheel.

11. The medical dispenser of claim 8, wherein each of the dispensing wheel floors comprises a V-shaped cut out that is vertically aligned with the V-shaped cutouts of the other dispensing floors.

* * * * *